United States Patent
Jones et al.

(10) Patent No.: US 7,533,798 B2
(45) Date of Patent: May 19, 2009

(54) DATA ACQUISITION AND PROCESSING SYSTEM FOR RISK ASSESSMENT

(75) Inventors: Derek W. Jones, Kirkcudbright (GB); James E. Dogul, Hudson, NH (US); Richard Galera, Nashua, NH (US); George E. Rollins, Chelmsford, MA (US); George K. Schuster, Royal Oak, MI (US); Suresh R. Nair, Amherst, NH (US); Ray C. Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 164 days.

(21) Appl. No.: 11/360,955

(22) Filed: Feb. 23, 2006

(65) Prior Publication Data

US 2007/0194097 A1 Aug. 23, 2007

(51) Int. Cl.
*G06F 17/00* (2006.01)
(52) U.S. Cl. .................................... 235/375; 235/382
(58) Field of Classification Search .......... 235/375–377, 235/382–383, 438
See application file for complete search history.

(56) References Cited

U.S. PATENT DOCUMENTS

| | | | |
|---|---|---|---|
| 5,363,474 A | 11/1994 | Sarugaku et al. | |
| 5,645,072 A | 7/1997 | Thrall et al. | |
| 5,715,388 A | 2/1998 | Tsuchihashi | |
| 6,037,857 A | 3/2000 | Behrens | |
| 6,057,777 A | 5/2000 | Dunne et al. | |
| 6,317,691 B1 | 11/2001 | Narayan et al. | |
| 6,455,807 B1 * | 9/2002 | Scott | 219/121.72 |
| 6,985,779 B2 | 1/2006 | Hsiung et al. | |
| 7,004,191 B2 * | 2/2006 | Shajii et al. | 137/487.5 |
| 2002/0143421 A1 * | 10/2002 | Wetzer | 700/100 |
| 2002/0194119 A1 * | 12/2002 | Wright et al. | 705/38 |
| 2003/0024992 A1 * | 2/2003 | Lewis | 235/472.01 |
| 2004/0049324 A1 | 3/2004 | Walker | |
| 2004/0215551 A1 | 10/2004 | Eder | |
| 2004/0267402 A1 * | 12/2004 | Speckhart et al. | 700/213 |
| 2005/0075970 A1 | 4/2005 | Doyle | |
| 2005/0075972 A1 | 4/2005 | Doyle | |
| 2005/0080720 A1 | 4/2005 | Betz et al. | |
| 2005/0149570 A1 * | 7/2005 | Sasaki et al. | 707/104.1 |
| 2005/0278786 A1 | 12/2005 | Tippett et al. | |
| 2006/0038688 A1 * | 2/2006 | Nakamura | 340/573.1 |
| 2006/0085118 A1 * | 4/2006 | Baldwin | 701/50 |
| 2007/0198108 A1 * | 8/2007 | Nair et al. | 700/83 |

OTHER PUBLICATIONS

International Search Report for PCT Application No. 07/62754 dated Sep. 11, 2007, 2 pgs.

* cited by examiner

*Primary Examiner*—Edwyn Labaze
(74) *Attorney, Agent, or Firm*—Amin Turocy & Calvin LLP

(57) ABSTRACT

Systems and methods of risk management that employ a risk assessment component to continuously update risk estimation associated with a machine of a manufacturing system. A data input component is provided for receiving a measured parameter associated with a current machine condition. A comparison is performed between the measured parameter from current machine condition with predetermined risk estimations/assessment parameters to determine whether the current machine condition is within the range of acceptable operator risk conditions.

20 Claims, 12 Drawing Sheets

DATA ACQUISITION AND PROCESSING SYSTEM FOR RISK ASSESSMENT

BACKGROUND

Manufacturing environments typically include large machines with a number of moving parts, such as factory robots, welding machines and the like, which can pose a safety risk to factory workers who work in close proximity to robotic devices. An assessment of the level of risk of harm to operators at a machine or process entails the collection of qualitative and quantitative data with regard to potentially hazardous situations.

International standard ISO 14121—"Safety of machinery—Principles for risk assessment"—defines that "risk" comprises two factors namely: consequences (or severity of injury) resulting from a hazardous situation; and probability of occurrence of the hazardous situation. The probability of occurrence itself is divided into two constituent parts namely: frequency and duration of exposure to a hazard; and lack of possibility of avoidance of harm. Such factors can be generically applied to all types of machinery for estimating the level of risk.

Consequently, a risk assessment is routinely performed to determine various risk factors that might be encountered from the machines. Such assessment includes determining the types of risk, e.g. the paths of moving parts, force of impact, high temperatures, and the degrees of risk associated with each type. In order to maximize the effectiveness of the risk assessment and risk estimation it is essential that accurate and detailed data is available upon which judgments concerning the basic factors above can be made.

Risk assessments are used to implement risk reduction measures, and to reduce risk to acceptable levels. In particular, safety related control systems are commonly integrated into machinery to reduce risk. In the case of a robotic device with swinging arms, a security perimeter is established to define a safe area. The security perimeter can be a fence with an entry gate having an interlock switch that shuts down the device upon entry. The perimeter can also be established by floor markings, alone or in combination with a photoelectric array for disabling the device if the plane of the perimeter is broken by the operator.

In general, the standard approach to risk assessment is satisfactory if all the factors can be anticipated. Very often they are embedded in the usage and training documentation supplied with the machine. But at all these stages, it is typical that some aspects are not yet known and some decisions have to be based on assumptions about future machine usage characteristics. If the actual machine usage characteristics differ from those assumed it may cause the risk assessment to become invalid.

Such unanticipated variations in the risk factors can arise due to various internal and external conditions. It may happen that a robotic device may operate under load-bearing conditions outside of specified parameters. Also, unpredictable machine behavior may result in the event of a power failure or control system failure. Additional risk may be encountered when multiple persons are present within a designated work area, or when there exists variations in operator skill. Also, various factors may change over time, due to machine wear and seasonal or climatic variations in temperature and humidity.

Despite all the aforementioned variations, it is not uncommon for a manufacturing operation to still be working with an original risk assessment that is no longer valid. This can result in unanticipated hazards to machine operators, leading to worker injuries and unexpected machine servicing, accompanied by production line delays. Such failures defeat the purpose of the initial risk assessment.

The type of safety related control system is specified according to the risk assessment. If the machine usage characteristics are such that the risk assessment becomes invalid, it could mean that the safety-related control system does not provide the type of functionality or level of integrity that is then actually required.

Typical reasons for variations in machine usage characteristics from the original risk assessment include, e.g. increased frequency or duration of machine operation, higher power levels, improper maintenance, processing of unexpected materials, unexpected environmental conditions, use by persons with competency levels lower than expected, occurrence of mechanical and software-related system faults, non-standard system components or operational modifications.

Risk assessment is ideally an iterative process that should be conducted at all phases of a machine's design, manufacture, commissioning and operation, with the results being handed on from one stage to the next, so as to take into account variations in risk factors. However, since risk assessments are typically performed manually during installation or maintenance of the machine components, it is prohibitively labor-intensive process to conduct ongoing manual risk assessments of all machines in a factory setting.

Therefore, there is a need to overcome the aforementioned exemplary deficiencies associated with conventional systems and devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods of risk assessment and management, via employing a risk assessment component associated with industrial controllers. A data input component can also be provided for receiving extrinsic data, which correspond to a measured parameter associated with a current machine condition. A data store component includes a plurality of risk assessment parameters associated with a range of acceptable operator risk conditions. Such risk assessment parameters can be stored in an internal or external storage medium.

The risk assessment component compares the measured parameter with the risk assessment parameters. Moreover, a determination can be made as to whether the current machine condition is within the range of acceptable operator risk conditions. Such determination can be supplied in real time for a control of the industrial process. For example, a control component can interact with the risk component to modify current machine condition, if the measured parameter is determined to not be within the range of acceptable operator risk conditions. A machine control signal can be communicated to the machines, and hence unsafe risk conditions can be mitigated.

In a related aspect, measured parameter(s) can be derived from an output of one or more sensors that are in communication with the machine(s). Each of the sensors can detect e.g. the speed, temperature or pressure of a machine component. Additionally, a proximity detector can be used for indicating an unsafe proximity of an operator to the machine component.

According to another aspect of the subject innovation, the risk assessment component can further include a comparison component that compares the measured parameter with the risk assessment parameters, to determine whether the current machine condition is within the range of acceptable operator risk conditions. The comparison component can further include one or more of an artificial intelligence component, a look up table, and enterprise resource planning component, and a prognostic component.

In another aspect, the subject risk management system includes a personal identification input for receiving an identification parameter associated with an individual operator. The personal identification input can receive the parameter from a code-entry interface, a swipe card, a biometric sensor, or a radio-frequency identification tag. One or more operator risk assessment parameters can be associated with the individual operator, and are also retained by the risk assessment component, preferably in a memory element.

Additionally, a routine can be included in the risk assessment component for accessing the operator risk assessment parameter upon receipt of the identification parameter. Such can determine whether the current machine condition is within a range of acceptable operator risk conditions associated with the individual operator. Accordingly, the subject system can mitigate safety risks associated with degrees of operator skill.

In yet another aspect, the control system can preferably include a machine control for modifying the current machine condition, such that the measured parameter is brought within the range of acceptable operator risk conditions. Alternatively, the control system component can include an override component for disabling one or more functions of the machine, if the current machine condition fails to fall within the range of acceptable operator risk conditions.

The subject risk management system can be contained in a discrete unit incorporated into a single machine. Alternatively, the subject innovation can be implemented as part of a system distributed in a variety of locations, which can further communicate over a network. Such network can include one or more elements of a safe network, a wireless network or the internet. The various components and the associated machines can be retained in a manufacturing facility. Optionally, the associated machines can be distributed over a plurality of manufacturing facilities.

To the accomplishment of the foregoing and related ends, certain illustrative aspects of the claimed subject matter are described herein in connection with the following description and the annexed drawings. These aspects are indicative of various ways in which the subject matter can be practiced, all of which are intended to be within the scope of the claimed subject matter. Other advantages and novel features may become apparent from the following detailed description when considered in conjunction with the drawings.

DETAILED DESCRIPTION

Figure 1:
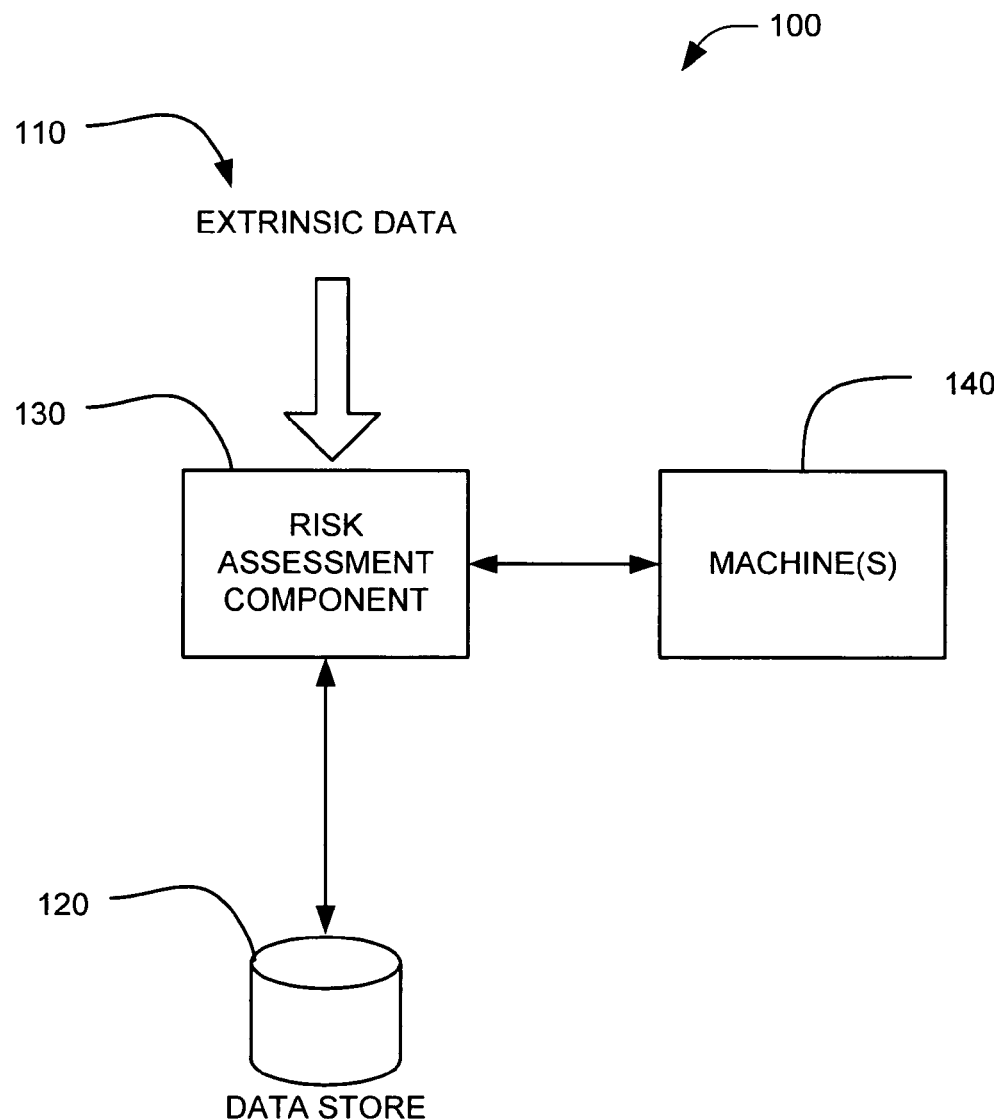
FIG. 1 is a block diagram of a risk assessment system in accordance with an aspect of subject innovation.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system", "routine" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter. Where there is reference to transmitting of data using a communication network or other means, it is understood that that data transmission means must have a suitable level of safety integrity.

The subject innovation provides for systems and methods of risk assessment and management, via employing a risk assessment component—wherein data is collected regarding actual machine condition/usage characteristics, and such data is processed and/or compared with predetermined data that reflect proper machine condition and usage characteristics (e.g., assumed data). The machine data can be collected dynamically (e.g., in the form of sensor data or control data) and/or generated in the form of prognostic data relating to future machine state(s). Data from machine(s) can be collected and/or generated in real-time (e.g., in situ, dynamically, typically without substantial lag time from origination to collection/generation). The machine data can be analyzed and the analysis thereof employed in connection with machine risk assessment and management, in conjunction with other manufacturing components or systems (e.g., production, scheduling, maintenance . . . ) so as to facilitate an overall business objective or series of objectives or concerns.

For example, the subject innovation can control a robotic machine manufacturing system in order to minimize a risk condition to operation and service personnel by monitoring and controlling one or more machine operating characteristics associated with the system, to operate within specified operating constraints. The innovation is hereinafter illustrated with respect to one or more robotic systems and controls thereof. However, it will be appreciated that one or more aspects of the subject innovation can be employed in operating other manufacturing processes, including but not limited to electronic, chemical, fabricating, and any related ancillary motorized system components, such as fans, pumps, conveyor systems, HVAC systems, compressors, gear boxes, motion control devices, screw pumps, mixers, as well as hydraulic and pneumatic machines driven by motors. Further other non-motorized systems are well within the scope of this invention, including but not limited to ovens, transportation systems, magnetic actuators, reaction vessels, pressurized systems, chemical processes, and other continuous processes. Also, other performance characteristics of a motorized system can be correlated with and/or determined from machine performance characteristics such as, life cycle cost, efficiency, life expectancy, throughput, emissions, operational cost, MTBF, noise, vibration, energy usage, and the like, for example.

Furthermore, the aspects of the subject innovation may be incorporated into a higher system level, as a part of an overall automation system such that one or more performance characteristics of the entire process are optimized globally. Moreover, as discussed herein aspects of the innovation discussed herein can be employed in connection with diagnostic and prognostic algorithms, smart machines and components, new sensor technologies, smart sensors, and integrate these technologies among others in a framework of an enterprise-wide asset management (EAM) system.

Turning initially to FIG. 1, a risk management system 100 is illustrated for risk management in accordance with an aspect of the subject innovation. As illustrated, extrinsic data 110 can be received through a data input component (not shown), wherein such extrinsic data 110 correspond to a measured parameter associated with a current machine condition. The data input component can include one or more sensors, or can be configured to receive sensor input as explained in detail below.

A data store component 120 can retain a plurality of risk assessment parameters associated with a range of acceptable operator risk conditions. Such risk assessment parameters can be retained in a secure memory (as explained in detail below) and form the basis for the "assumed data" employed as a comparison reference.

A risk assessment component 130 is provided for comparing the measured parameter associated with the extrinsic data 110, with the risk assessment parameters from the data store component 120. Accordingly, a determination can be made as to whether the current machine condition is within the range of acceptable operator risk conditions.

The risk assessment component 130 can further communicate with the machine(s) 140, e.g. a manufacturing robotic device, wherein if the measured parameter is determined to not be within the range of acceptable operator risk conditions, then current machine condition(s) can be modified to obtain acceptable limits. For example, the risk assessment component 130 can send a machine control signal to the machine(s) 140, to vary the machine operation and correct an unsafe risk condition.

Figure 2:
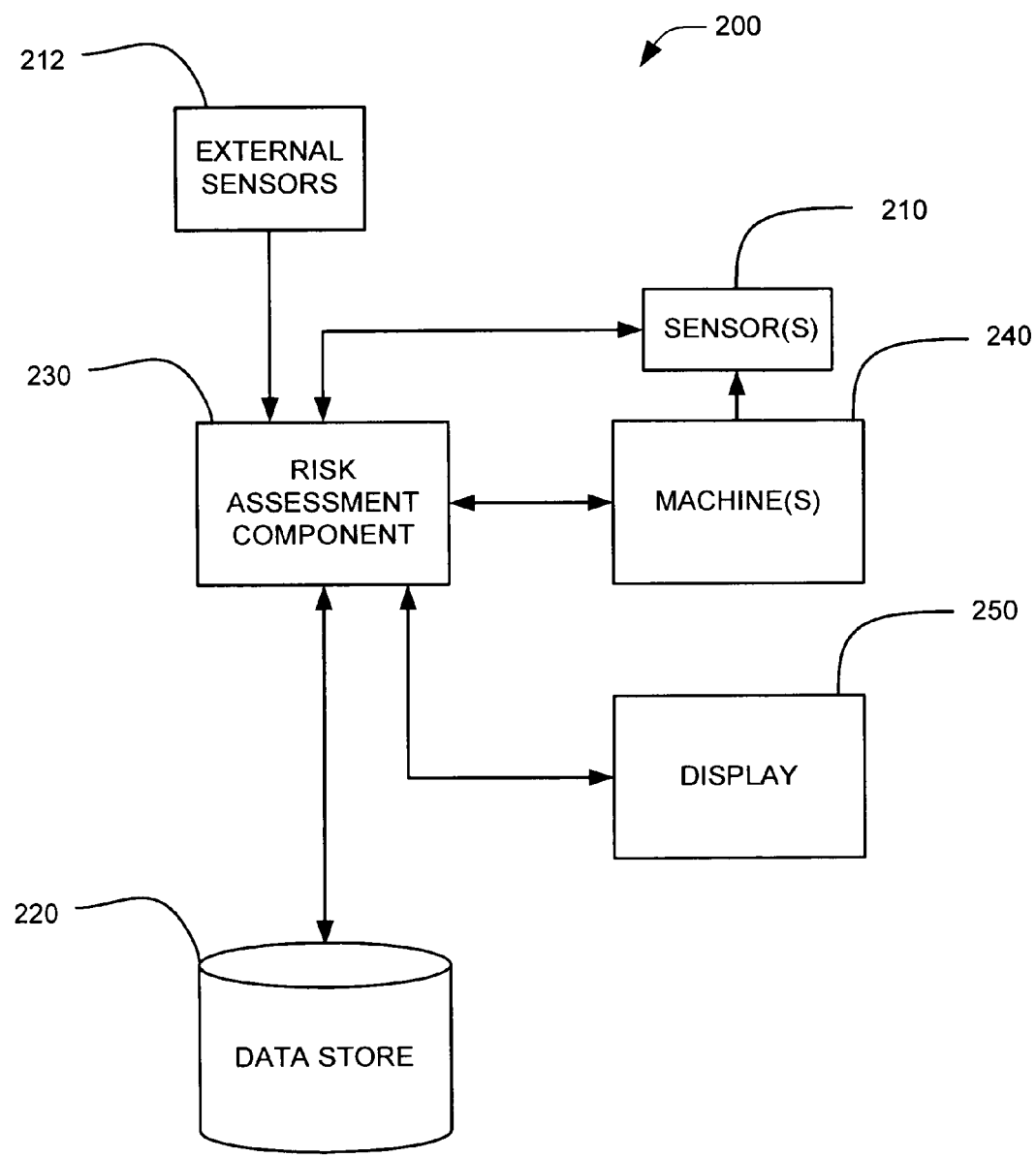
FIG. 2 illustrates an exemplary configuration of a risk assessment and management system.

An exemplary embodiment of the subject risk assessment and management system 200 is illustrated in FIG. 2. The machine(s) 240 can include one or more robotic devices, each for performing one or more automated manufacturing processes, e.g. part placement and/or fastening, welding, coating and the like. The data input component (not shown) can be associated with one or more sensors 210 for deriving the measured parameter from the machine component. The sensors 210 can be placed on a respective robotic device associated with the machine(s) 240 in a suitable location. One type of sensor 210 can measure the speed of the robotic device. The sensor 210 can measure parameters such as the rate of rotation of a rotating component (e.g. a screw head) or rate(s) of translation of a component (e.g. a robot arm) in one or more directions in an XYZ coordinate system, for example. Sensor 210 can also measure temperature of a robotic device associated with machine 240 at a suitable location, e.g. within the motor of the machine(s) 240 and/or at a working end, e.g. a tool head. A temperature sensor 210 can therefore indicate an undesirable overheating condition or a malfunction state if the temperature is deemed too low, for example.

The sensor 210 can also be employed for measuring the pressure of a robotic device associated with the machines 240. The pressure can be a hydraulic pressure associated with power delivery to displace the robotic device associated with machine 240, or to lift and/or close a movable element. The pressure can also be an internal pressure associated with load placed upon the machine 240 at any suitable load-bearing point. Other types of sensors 210 could be used to monitor various device conditions. For example, an event sensor could be used to record specific events in a machine (e.g. completed tool cycles and the like.) Also, humidity or other types of environmental sensors could be employed, along with any other suitable types that would occur to those skilled in the art. The output of one or more of the sensors 210 can be an analog signal having an amplitude and/or frequency spectrum representative of the physical parameters of the machine. Alternatively, the sensor output can be a digitized version of the analog signal, having corresponding properties. Still further, the sensor 210 can include an implementation for encoding a measured analog signal into a data packet containing a standard machine-readable code and deployed across a network so as to indicate a specific measured operational parameter.

In another aspect of the innovation, an external sensor(s) 212 can be used to provide parameter information on a non-device factor that impinges on risk assessment. For example, the external sensor 212 can include a proximity detector that can be used for indicating an unsafe proximity of an operator to the machine component. Such proximity detector associated with external sensor 212 can be in the form of a photocell detector or motion sensor configured to actuate in the event that the plane of the sensor is broken.

Alternatively, the external sensor 212 can be a contact switch positioned on a protective fence that actuates when a gate is opened to allow close operator access to the device 202. Also, the sensor 212 can be a pressure-actuated switch in a floor plate that is actuated when an operator steps into an unsafe area, for example. A data store 220 retains a plurality of risk assessment parameters associated with a range of acceptable operator risk conditions. The data store 220 can include a suitable memory, either cooperating with programmable software residing on a computer system or as hard-wired circuitry for processing an analog or digital signal. The risk assessment parameters are typically saved reference parameters that are representative of an acceptable-risk operational state for the machines. Such reference parameters can represent an initial state of operation, at machine installation, or can represent an iterative, corrected condition as discussed in detail below.

As illustrated in FIG. 2, a risk assessment component 230 can be provided for receiving the measured parameter output from the sensors 210, 212, and further access the saved reference parameters in the data store component 220. The risk assessment component 230 can compare the measured parameter(s) with predetermined risk assessment parameters, and evaluate whether the current machine condition is within the range of acceptable operator risk conditions. The risk assessment component 230 can be a programmable software implementation operating on a computer system, or can be an analog or digital hardware component having dedicated circuitry, suitable to processing a respective sensor output, in accordance with the various aspects of the subject innovation.

The risk assessment component 230 outputs a signal in accordance with the comparison determination. Such output signal can be received and processed by the machine 240. For example, if the risk assessment component 230 indicates that the sensor measurement is outside the range of acceptable operator risk conditions, then the risk assessment component 230 can modify the current machine condition of the machine component 240, via a machine control signal communicated to the machines, for example.

The risk assessment component 230 can preferably be an interactive component of a programmable logic computer (PLC) as is typically used for machine control. In the event that the current machine condition needs to be modified, the PLC varies the machine operation (e.g. electrical or hydraulic power) to the robotic device(s) associated with the machine 240, so that the measured parameter (e.g. speed, temperature or pressure) is regulated to fall within the range of acceptable operator risk conditions.

In a related aspect, the external sensor 212 of the subject risk management system 200 can include a personal identification input for receiving an identification parameter associated with an individual operator. The personal identification input can include a code-entry interface, a swipe card, a biometric sensor, a radio-frequency identification tag, or any suitable personal identification implementation, for example.

Moreover, the risk assessment component 230 can retain one or more operator risk assessment parameters associated with the individual operator. A routine can then be included for accessing the operator risk assessment parameter upon receipt of the identification parameter. The risk assessment component 230 can subsequently determine whether the current machine condition is within a range of acceptable operator risk conditions associated with the individual operator. Presumably, the risk factors associated with a trainee are greater than a seasoned, veteran operator or maintenance technician. Accordingly, the subject innovation accommodates safety factors associated with degrees of operator skill.

The exemplary system 200 also includes a display 250 for displaying data in connection with risk assessment and management. The display 250 can provide ongoing status information and can also display a warning condition if risk assessment is determined to be in an unsafe condition. The risk level can be displayed as an aggregate warning, and/or can be displayed alongside various readings corresponding to the measured parameters, e.g. speed, temperature and pressure associated with a machine component 240. The display 250 can include a typical computer monitor or a display portion thereof (e.g. a "window"). The display 250 can optionally include an alphanumeric display, or an array of lights, dials and/or other indicators.

Figure 3:
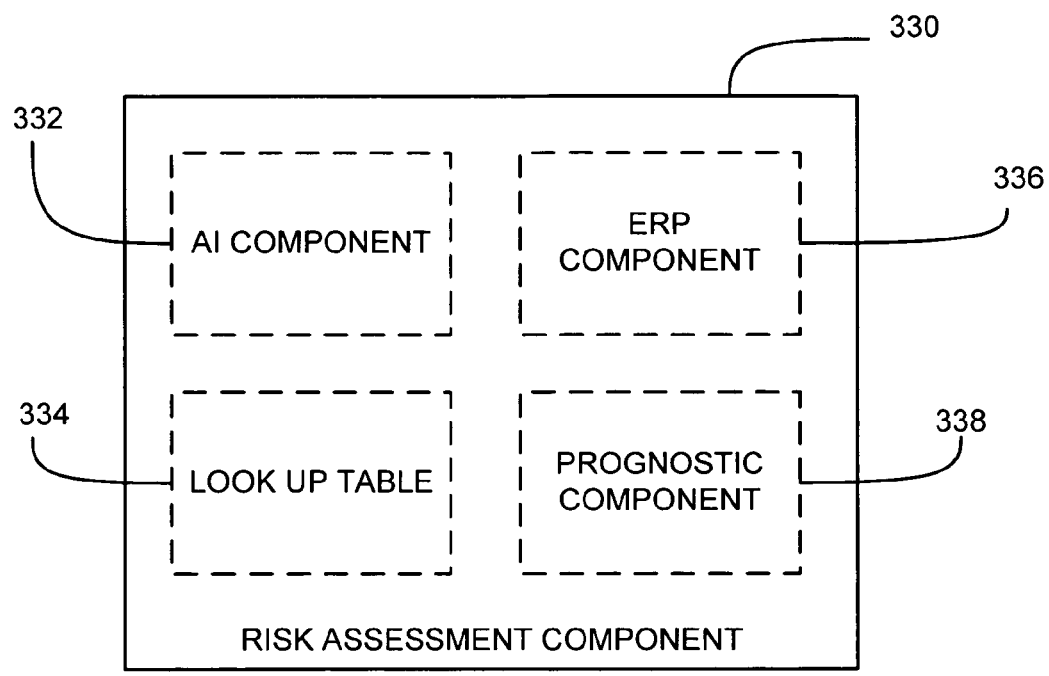
FIG. 3 illustrates an exemplary configuration of a risk assessment component implemented as part of the subject innovation.

FIG. 3 shows a particular configuration of a risk assessment component of the subject innovation. The comparison function of the risk assessment component 330 can be carried out using one or more suitable components, including an artificial intelligence component 332, a look up table 334, an enterprise resource planning component 336, and a prognostic component 338.

The artificial intelligence (AI) component 332 can perform a statistical analysis upon incoming sensor data, and process this information to reach a risk assessment conclusion. Any type of AI system can be employed, including (but not limited to) neural network, a Bayesian network, a "fuzzy logic" system and the like. A lookup table 334 compares the values of the sensor readings with predetermined values recorded therewith. A range of values can be indicated. The lookup table 334 can be employed in conjunction with the AI component 332, or operate alone to provide an economical solution for certain types of end-user systems.

The enterprise resource planning (ERP) component 336 facilitates analyzing the machine data as well as data relating to business concerns (utilities, processes, accounting, manufacturing, and the like.) The data can be analyzed and the risk assessment component 330 can further execute various optimization programs to identify configurations of the various components, to converge more closely to a desired business objective.

For example, one business objective can be to operate in a "just in time" (JIT) manner and reduce costs as well as satisfy customer demand. If the risk assessment component 330 determines that a possible safety risk scenario can result in the manufacturing facility being offline for an extended period, the ERP component 336 can determine that it is more optimal given the current business objective to run the machines below their highest rate (e.g. at 60% rather than 90%), which would result in improved plant safety with reduced down time.

The ERP component 336 can also correlate the risk assessment with machinery prognostics to schedule the next scheduled maintenance down time for a subsequent lower productivity period, reducing loss of profit, and anticipating the maintenance labor and repair parts costs. Such can also result an overall savings associated with less power consumption as well as increasing life expectancy of the machines as a result of operating the machines as a reduced working rate. The risk assessment component 330 can also include a prognostic component 338 that provides for collecting and/or generating data relating to historical, current and predicted operating state(s) of the machines. The prognostic component 338 can exchange and share data so as to schedule maintenance of a particular machine, or load balance.

Figure 4:
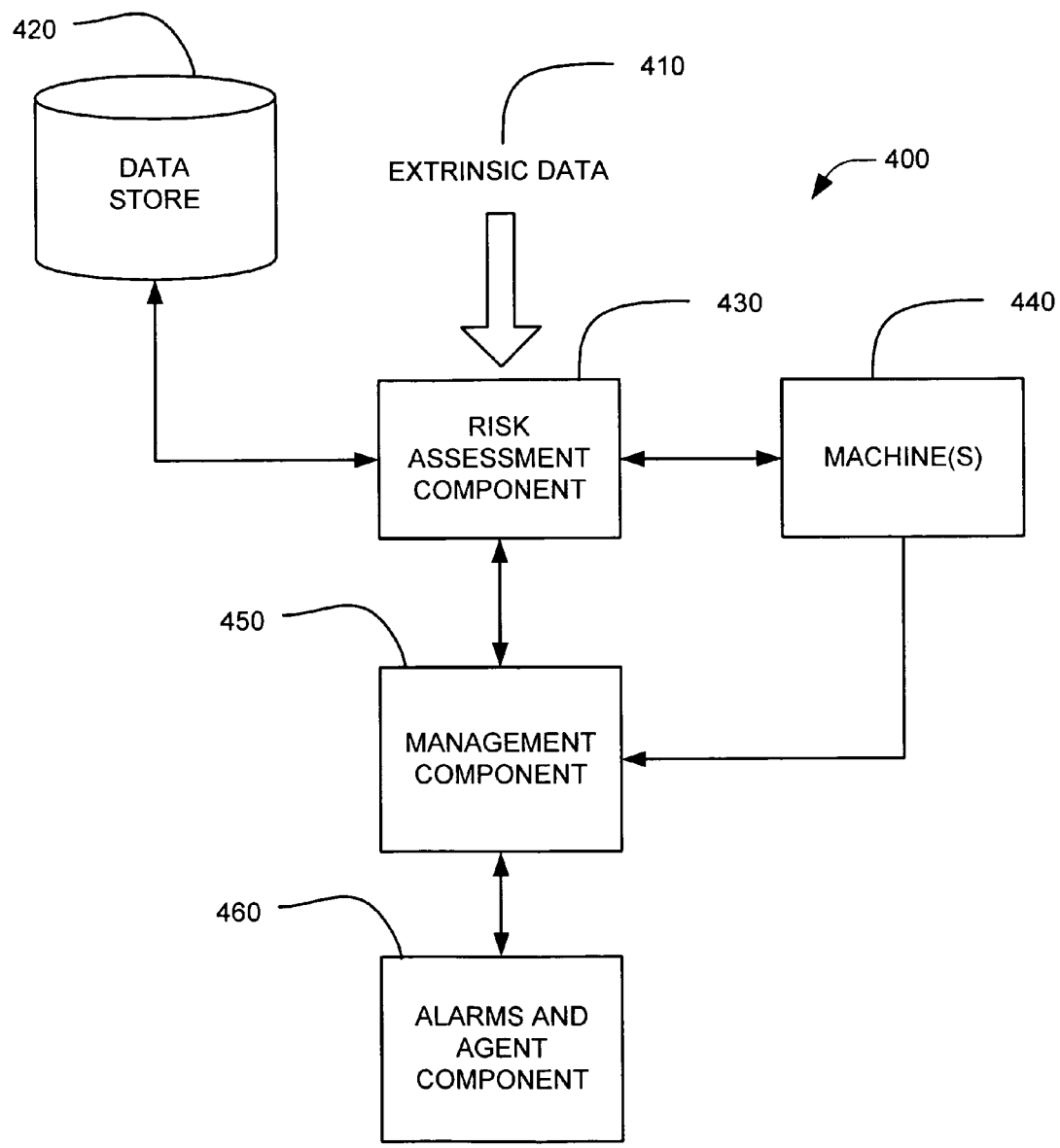
FIG. 4 illustrates an exemplary configuration of a risk assessment and management system incorporating an alarm and alert component.

An exemplary embodiment of the subject risk assessment and management system 400 is illustrated in FIG. 4. As in the above aspects, extrinsic data 410 in the form of one or more measured parameters is received and compared with saved reference parameters retained in the data store 420. A risk assessment component 430 compares the measured parameters with the risk assessment parameters so as to determine whether the current machine condition is within the range of acceptable operator risk conditions.

The risk assessment component 430 performs a comparison and outputs a signal in accordance with the comparison determination. If the risk assessment component 430 indicates that the current machine condition is outside the range of acceptable operator risk conditions, the risk assessment component 430 modifies the current machine condition of the machine 440.

As shown in FIG. 4, the exemplary aspect includes a management component 450 that communicates with a larger enterprise network system. The management component 450 receives signals from and manages the operation of the risk assessment component 430. The management component 450 also receives signals from the machine 440 and in turn regulates the machine operation. In this way, a closed loop system is provided.

In a further aspect, as shown in FIG. 4, the management component 450 can send a signal to an alarm and alert component 460 for creating a visual and/or audible warning. Such alarm and alert components can include an alarm or flashing light indicia, to alert operators and maintenance personnel of a risk condition, for example. It is further contemplated that the alert device 460 can also include a communications device for sending a message to management and/or maintenance personnel, e.g. a text or voice message, pager message, email.

Figure 5:
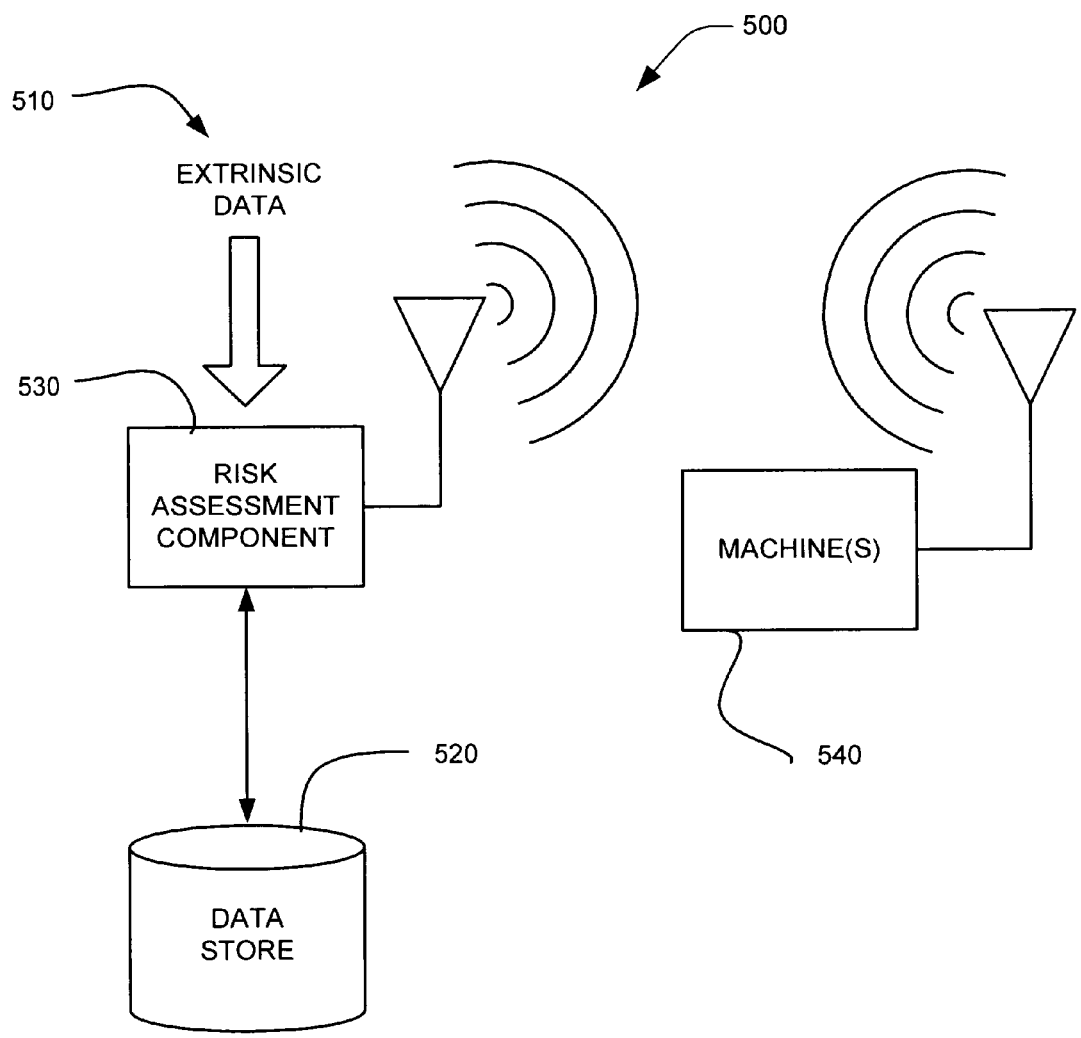
FIG. 5 illustrates an exemplary configuration of a risk assessment and management system incorporating wireless communication.

An exemplary risk assessment and management system according to the subject innovation is illustrated in FIG. 5. As shown above, extrinsic data 510 is received and compared with predetermined reference parameters retained in the data store 520. A risk assessment component 530 compares the measured parameters with the risk assessment parameters, to determine whether the current machine condition is within the range of acceptable operator risk conditions. If it is determined that the current machine condition is outside the range of acceptable operator risk conditions, the risk assessment component 530 modifies the current machine condition of the machine 540. As illustrated in FIG. 5, the risk assessment component 530 communicates with the machine(s) 540 using a wireless system. Signals can be exchanged wirelessly between various components using any wireless system, including but not limited to radio, IR, microwave, and in accordance with any suitable protocol, e.g. Bluetooth, or across a wireless packet-switched network, e.g. in accordance with any of the IEEE 802.11 protocols. It is to be appreciated that various aspects of the subject innovation can be implemented in a discrete unit incorporated into a single machine and/or distributed in a variety of locations, and in communication over a network.

Figure 6:
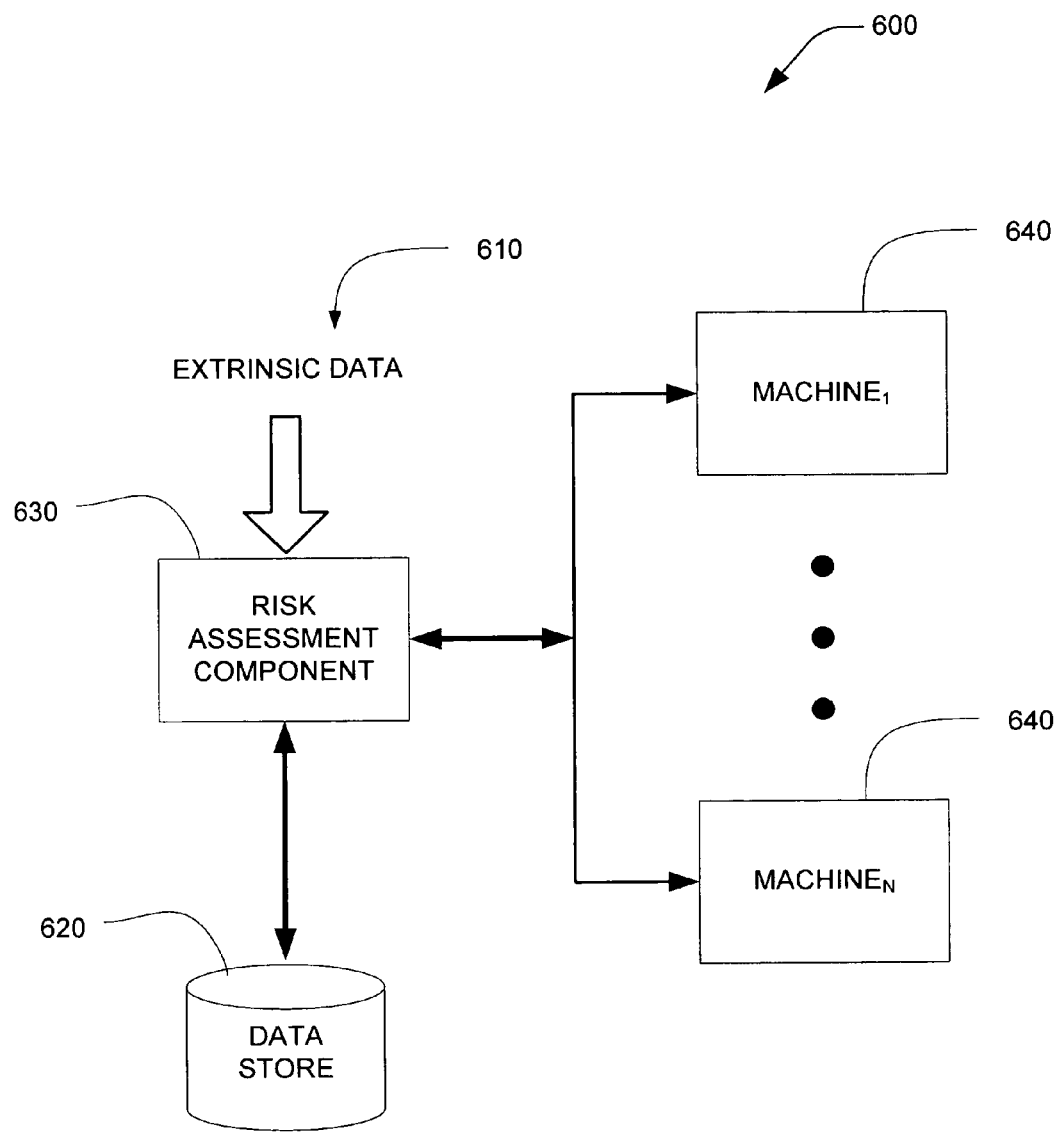
FIG. 6 illustrates an exemplary configuration of a risk assessment and management system having components that are distributed over a network.

FIG. 6 illustrates a system 600 according to an exemplary aspect of the subject innovation, wherein a risk assessment component regulates performance of machines 640 (1 thru N, N being an integer). The risk assessment component 630 employs extrinsic data 610 (e.g., from sensors) and data from data store 620 to perform a comparison, and adjust current machine condition, as discussed in detail above. As shown in the exemplary system of FIG. 6, the risk assessment component 630 can govern a plurality of machines 640 (MACHINE$_1$ through MACHINE$_N$—N being an integer) distributed over a network. The various components of the system 600, e.g. sensors (not shown), data store 620, and risk assessment component 630, along with the associated machines 640, can be retained in a single manufacturing facility, and/or can be distributed over a plurality of manufacturing facilities, across a region, a nation or globally. Accordingly, geography is typically no impediment to risk management and assessment over a corporate network.

In such an extended network 600, the robotic devices associated with machines 640 can be fitted with sensors in the manner described above, for communicating with the risk assessment component 630 over a local area network, a wide area network, or the Internet. Also, more than one risk assessment component 630 can be employed for the network, to provide redundant back-up systems, and/or to offload processing between multiple plant operations.

Figure 7:
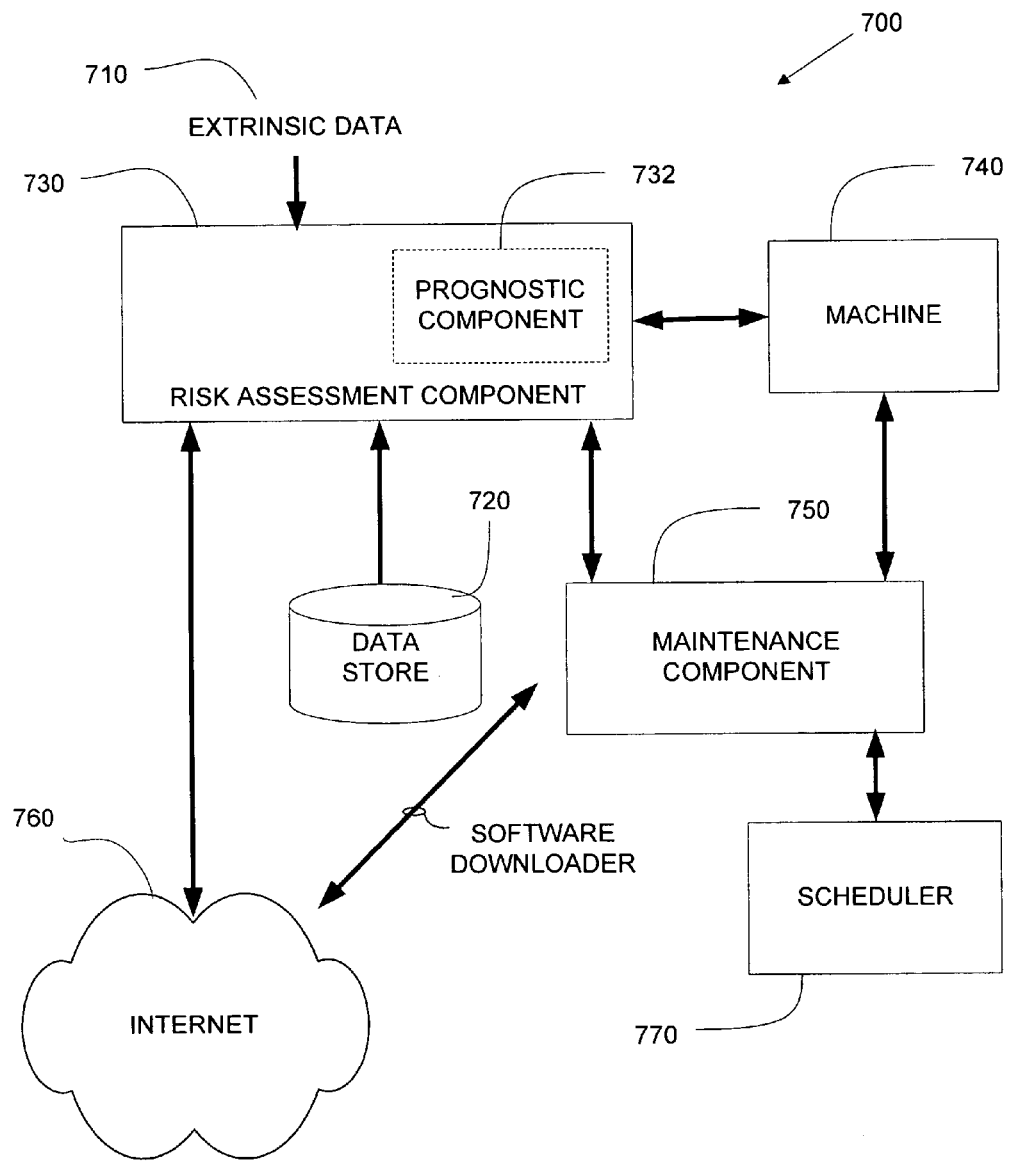
FIG. 7 illustrates an exemplary configuration of a risk assessment and management system incorporating a maintenance component.

FIG. 7 illustrates another risk assessment and management system 700 in accordance to an exemplary aspect of the subject invention. For example, extrinsic data 710 gathered form sensors can be compared to predetermined data saved in the data store 720. Based on such comparison act, the risk assessment component 730 can adjust the current condition of the machine(s) 740. The risk assessment component 730 can further include a prognostic component 732 that provides for collection and/or generation of data that relate to historical, current and predicted operating state(s) of the machines, 740 for example. Moreover, a maintenance component 750 can act in an open loop system with the risk assessment component 730 and the machine(s) 740, wherein such maintenance component can guard against risk factors that can arise due to software related errors in the risk assessment component 730 and the machine(s) 740. For example, some errors can arise due to old software versions no longer supported. Other errors can arise from a software glitch in newer versions. The maintenance component 750 can access/search the internet 760 to download software patches or updated versions for manufacturing components. In addition, the maintenance component 750 can automatically download anti-virus software from the internet 760 to correct problems associated with computer viruses that target industrial computers. Such software upgrades can be performed at regular intervals, or as needed to correct a specific machine condition.

The maintenance component 750 can cooperate with a scheduler component 770 that arranges the periods of downloading software upgrades. The prognostic component 732 can compile data from the machine component 740, to schedule maintenance of a particular machine. The prognostic component 732 can receive such data from within the system 700 or from the internet 760.

Figure 8:
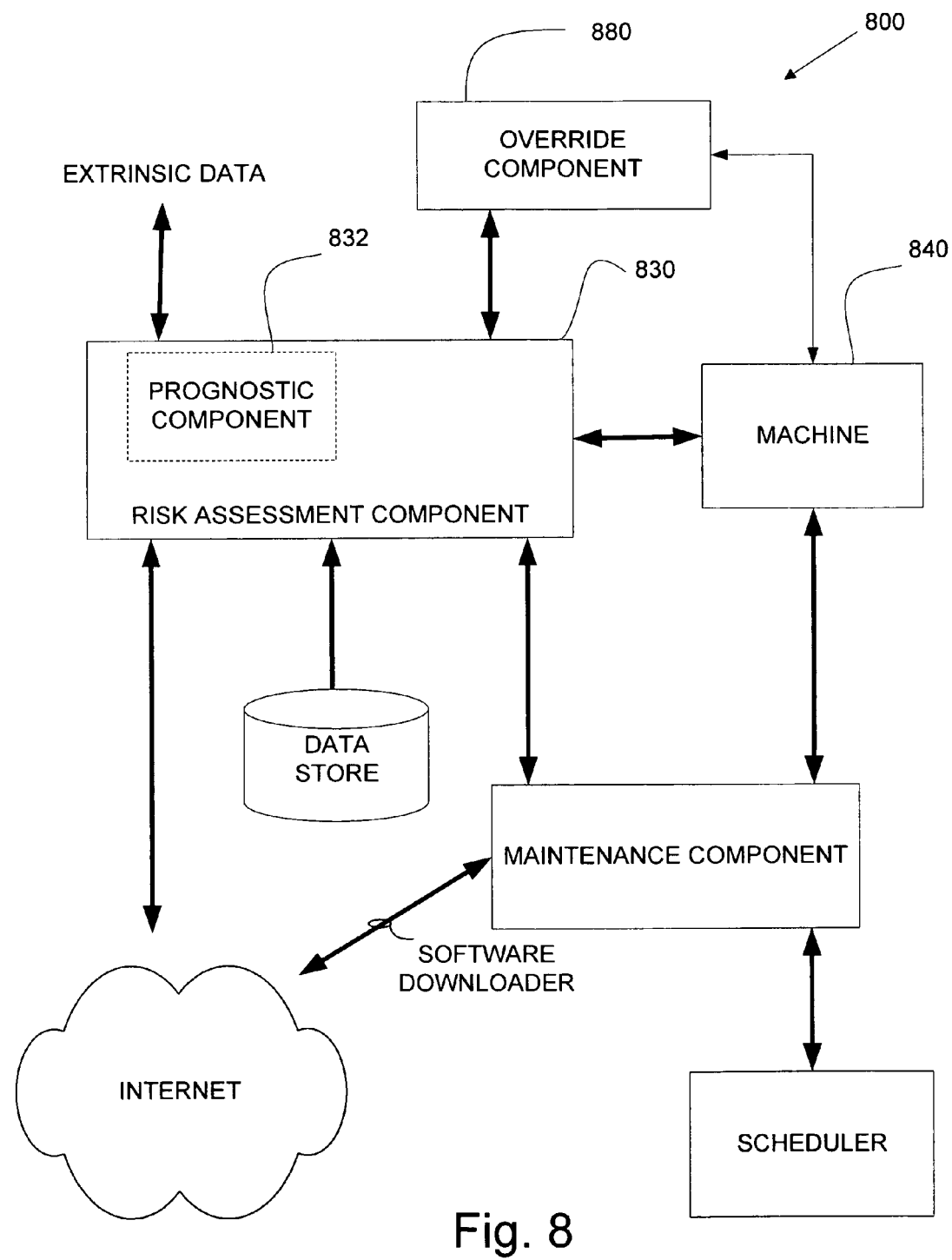
FIG. 8 illustrates an exemplary configuration of a risk assessment and management system incorporating a maintenance component in cooperation with an override component.

FIG. 8 illustrates a particular risk assessment and management system 800 that employs an overwrite component 880 in accordance with an aspect of the subject innovation. The risk assessment component 830 can activate the override component 880 for modifying the operation or even disabling the power supply to the device 840, if the current machine condition is determined to not be within the range of acceptable operator risk conditions. The override component 880 can cut power to a specific sub-component or to the entire robotic device 840, as determined in order to insure operator safety.

Accordingly, in general only the features of the machine(s) 840 that are deemed to pose a risk are disabled, while other features that are deemed safe to operate can continue, (e.g., a pump or a conveyor.) As such, a full line shutdown can be avoided, and the associated downtime mitigated.

Figure 9:
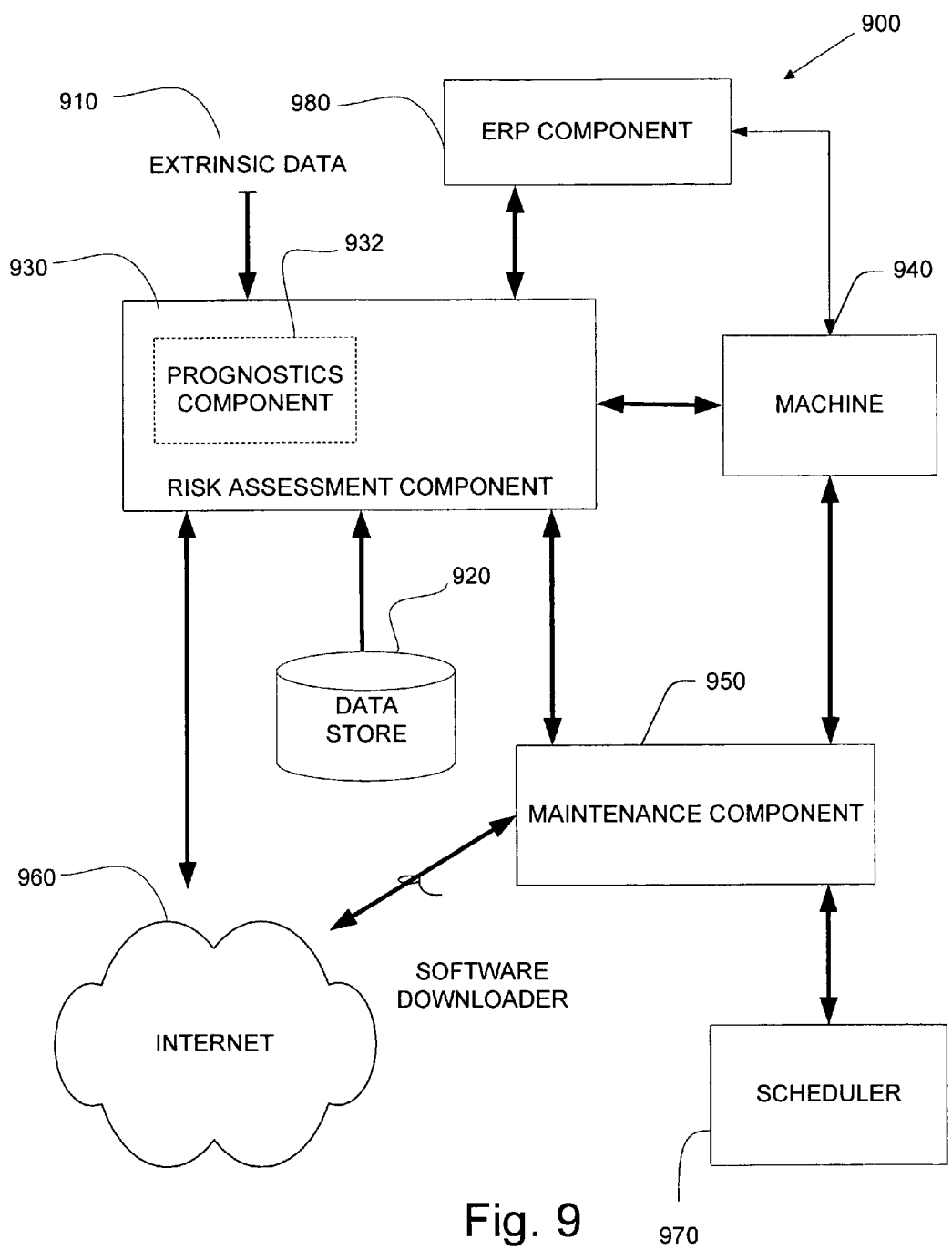
FIG. 9 illustrates an exemplary configuration of a risk assessment and management system incorporating a maintenance component in cooperation with an enterprise resource component.

In a related aspect and as illustrated in FIG. 9, an enterprise resource planning (ERP) component 980 can be implemented as part of the risk and management system 900. Such ERP component can facilitate analyzing machine data and data relating to business concerns (e.g., utilities, processes, accounting, manufacturing, and the like). The data is analyzed and the risk assessment component 930 executes various optimization programs to identify configurations of the various components, to converge more closely to a desired business objective.

Moreover, a condition-monitoring asset management system can be employed for data collection and processing. Such system can communicate over a "safe network," and open, wire-independent layered network architecture—wherein components communicate via encoded packets, such as Control & Information Protocol (CIP) for component communication, and enables merging with virtually any physical or data-link layer, including EtherNet. By encoding instructions in a packet-switched manner, a safe network eliminates the need for individual communication wires to be strung between components, allowing a single communication bus for the safe network. Use of an existing asset management system for risk assessment and management can include additional sensors that provide a more detailed analysis of device operation, such as humidity sensors, and the like. Such can typically supply a sufficient level of safety data integrity. Moreover, more than one sensor can be employed per device, to provide a more complete physical description of the device and thereby ensure the maintenance of a desirable risk condition.

The subject innovation enables a degree of data collection and processing such that aspects of a risk assessment are continuously monitored or generated, and can be directly linked to measures to reduce risk. The subject system and method also includes the option for the provision of data into a separate or combined system such that levels of safety integrity and levels of machine functional availability can be set and varied according to the machine condition and usage characteristics. Moreover, predictive capabilities such as trending can also be employed. By observing trends in variations in measured parameters, it is possible to anticipate risk conditions that might arise in the future. Accordingly, serious risk conditions can be prevented in advance. Also, in observing and studying risk assessment trends in similar devices and operations over a single plant or a network of facilities, it may be possible to significantly reduce risk over a period of time.

Figure 10:
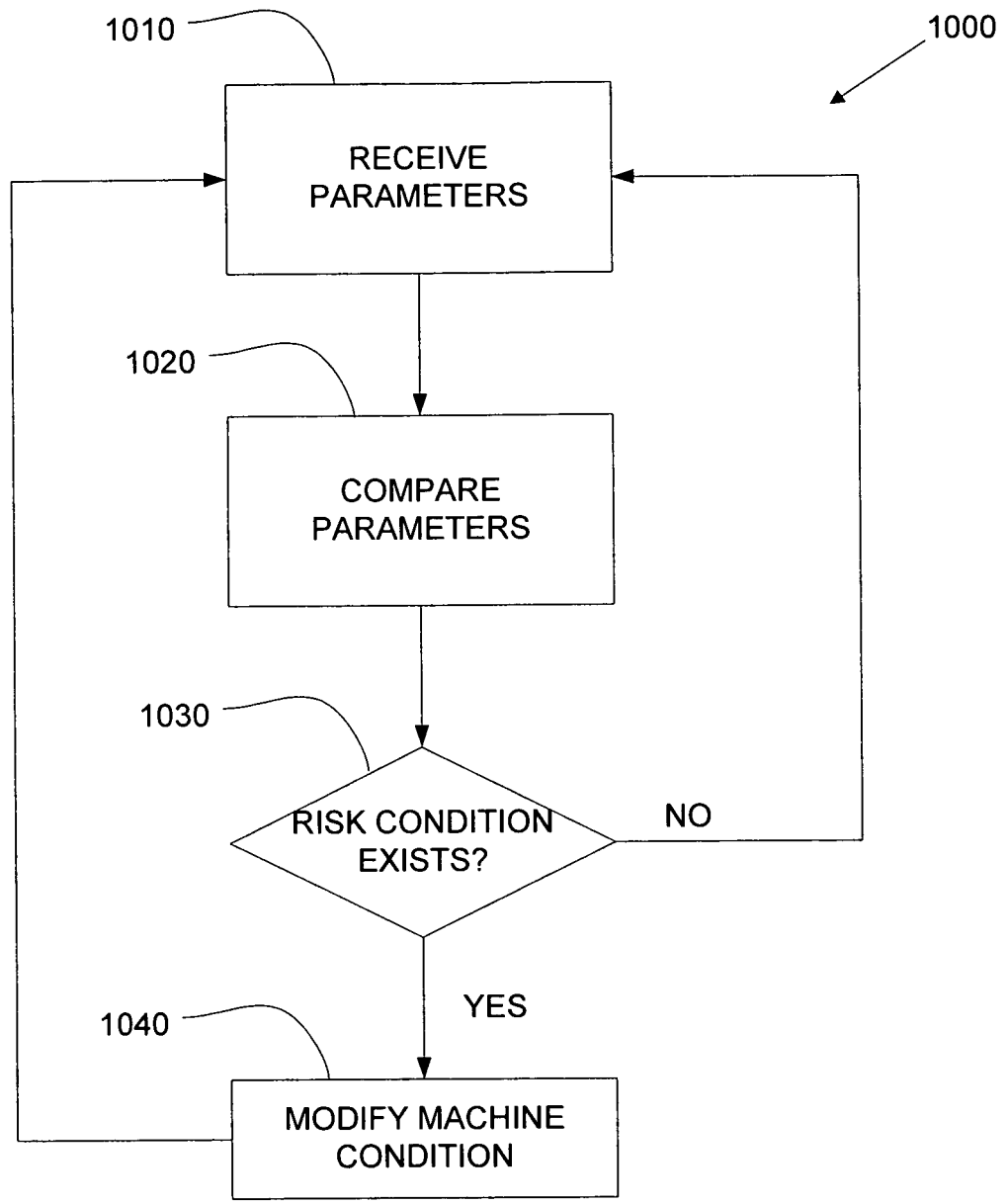
FIG. 10 illustrates an exemplary method of risk assessment and management in accordance with the subject innovation.

FIG. 10 illustrates an exemplary methodology of risk assessment and management in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 1010, the measured parameters (e.g. sensor data input) and risk assessment parameters (e.g. saved data) are received. The measured and saved parameters are then compared at 1020. At 1030, a decision can be made as to whether a risk condition exists. If a risk condition does exist, then the methodology 1000 proceeds to 1040, wherein current machine condition is modified. Upon such modification, the methodology 1000 returns to act 1010. Alternatively, and if a risk condition does not exist, then no action is taken and the methodology 1000 returns to act 1010.

Figure 11:
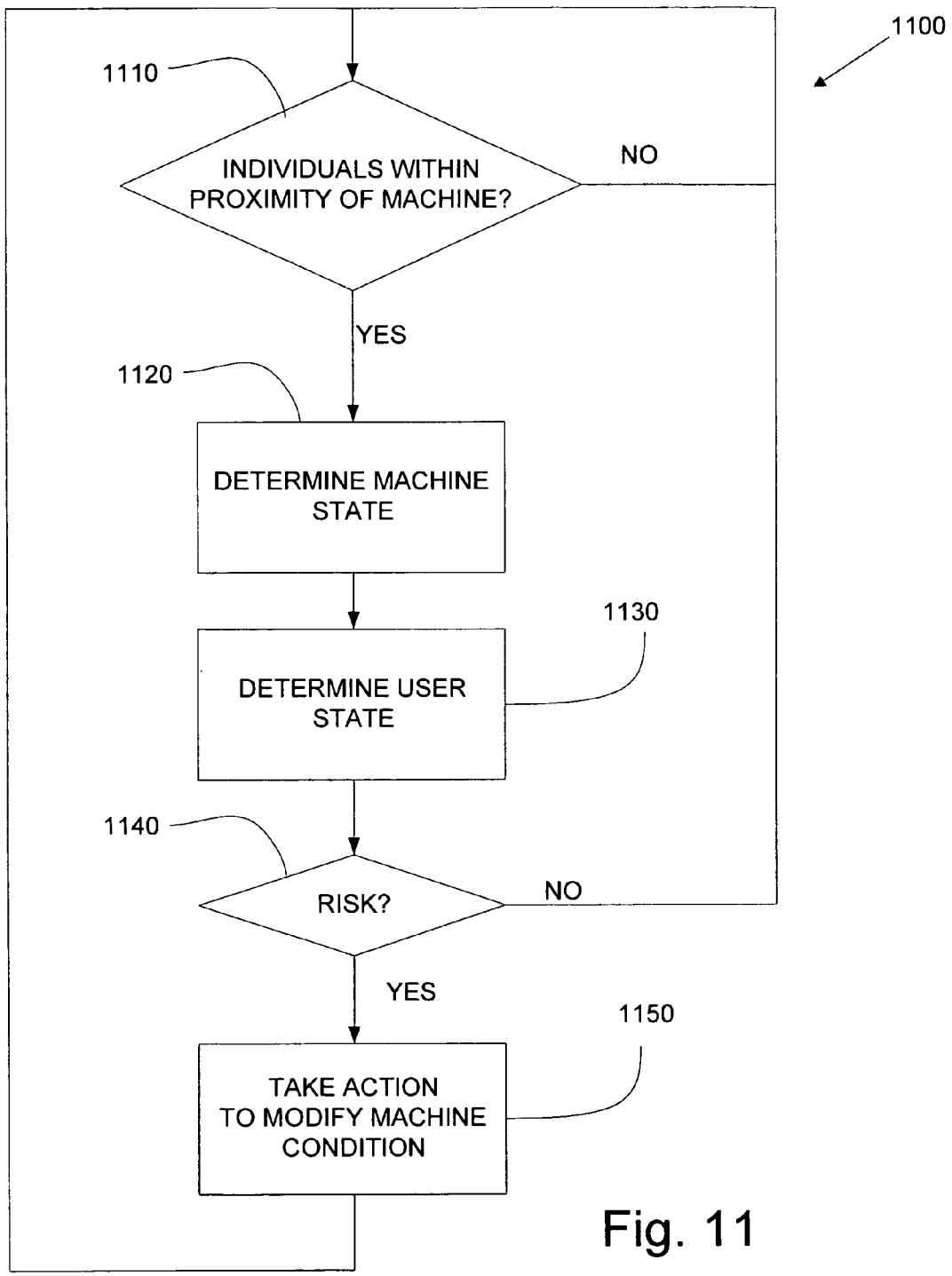
FIG. 11 illustrates an exemplary methodology of risk assessment and management according to an aspect of the subject innovation.

A related methodology 1100 is illustrated in FIG. 11. Based on a proximity sensor input or specific user profiles as explained above, a decision 1110 is made whether an individual is within a predetermined proximity of the machine. If the individual is not within a predetermined proximity, the sub-algorithm returns to act 1110. Otherwise, and if the individual is within a predetermined proximity, at 1120 a determination is made of the machine condition, from sensor input and/or other extrinsic data. Subsequently, a determination is performed of the user state, at 1130 e.g. skill level or experience associated with the user profile. Next, and at 1140, a decision is made whether a risk condition exists for a specific user. If NO, the sub-algorithm returns to its initial state. If YES, action is taken to modify the current machine condition, after which the sub-algorithm returns to act 1110.

Figure 12:
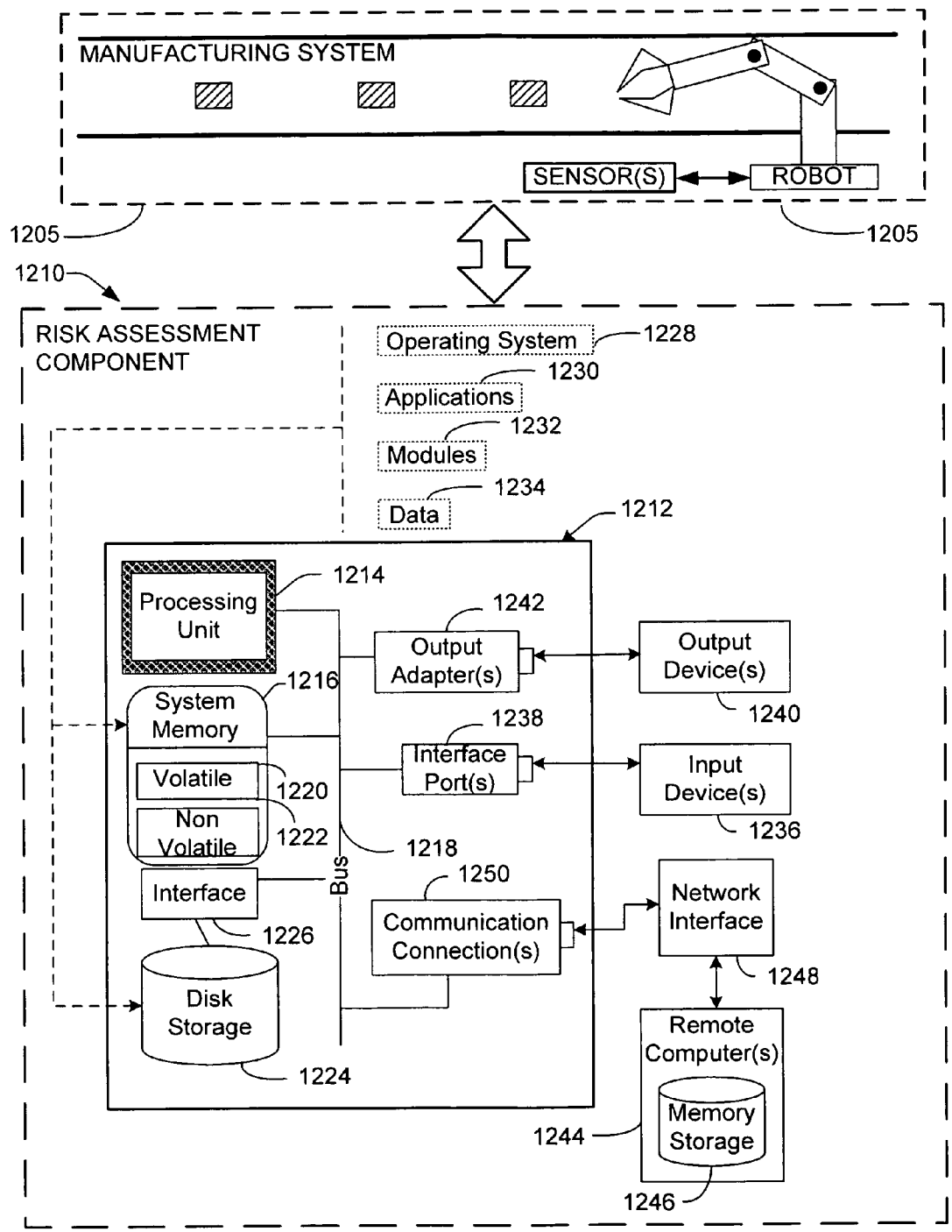
FIG. 12 illustrates a particular block diagram of a risk assessment component in accordance with an aspect of the subject innovation.

FIG. 12 illustrates a risk assessment component 1210 that in real time updates risk estimation of machines, and continuously monitors/compares risk associated with actual characteristics of machines for the manufacturing system 1205, for example in real time. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the risk assessment component 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that various components described herein can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A risk management system comprising:
    a risk assessment component that updates in real time risk estimations of one or more machines via operational data collected from sensors operatively connected to the one or more machines;
    a data input component associated with the risk assessment component for acceptance of the operational data; and
    a routine that accesses an operator risk assessment parameter associated with a machine operator upon receipt of an identification parameter associated with the machine operator, the operator risk assessment parameter based at least in part on the machine operator's skill level and used by the risk assessment component to determine whether the current risk estimation is within a range of acceptable operator risk conditions associated with the machine operator.

2. The risk management system of claim 1, further comprising a data store that retains risk assessment parameters for a comparison with current risk estimation(s) of the one or more machines.

3. The risk management system of claim 2, further comprising an override component that disables operation of the one or more machines when the current risk estimations are outside the risk assessment parameters.

4. The risk management system of claim 2, further comprising a machine control system that regulates current machine condition to bring the current risk estimation within range of the risk assessment parameters.

5. The risk management system of claim 2, further comprising a proximity detector.

6. The risk management system of claim 2, further comprising a personal identification interface that receives identification parameters for the machine operator.

7. The risk management system of claim 6, further comprising an enterprise resource planning component that analyzes business objectives in relation to the risk estimations and schedules future machine maintenance downtime based on the analysis.

8. The risk management system of claim 6, the personal identification interface is one of a code-entry interface, a swipe card, a biometric sensor, or a radio-frequency identification tag.

9. The risk management system of claim 6 further comprising an artificial intelligence component.

10. The risk management system of claim 6 further comprising a prognostic component that collects and generates data relating to historical, current, and predicted operating states of the machines.

11. The risk management system of claim 1 further comprising a comparison component for comparison of current machine condition parameters with the operator risk assessment parameters.

12. A method of risk management comprising:
   accepting a measured parameter associated with a current operating condition of one or more machines;
   updating in real time a risk estimation for the one or more machines based on the measured parameter;
   receiving a personal identification from a user;
   retrieving at least one operator risk assessment parameter associated with the user upon receiving the personal identification from the user; and
   determining whether the current risk estimation for the one or more machines is within a range of acceptable operator risk conditions, the acceptable operator risk conditions determined by the at least one operator risk assessment parameter associated with the user.

13. The method of claim 12 further comprising comparing the measured parameter with a risk assessment parameter that is associated with a range of acceptable machine operator risk conditions.

14. The method of claim 12 further comprising identifying optimal machine operation schedules via an analysis of the measured parameter correlated with data relating to business concerns.

15. The method of claim 14 further comprising sending a control signal to the one or more machines that modifies current machine conditions upon determining that the current risk estimation is not within range of acceptable machine operator risk conditions, the modification bringing the current machine conditions within range of the acceptable machine operator risk conditions.

16. The method of claim 14 further comprising
   predicting a future operating state for the one or more machines based on collected machine data; and
   automatically scheduling maintenance for the one or more machines during an inferred future low productivity period.

17. The method of claim 15 further comprising disabling power to at least a portion of the one or more machines upon determining that the parameter is not within range of the acceptable machine operator risk conditions.

18. The method of claim 12 further comprising employing a proximity detector to assess risk.

19. The method of claim 18 further comprising accessing a risk of the machine operator.

20. A risk management system comprising:
   means for updating risk estimations of one or more machines in real time based in part on current operating conditions;
   means for accepting data for risk estimations;
   means for receiving a personal identification from a user;
   means for retrieving at least one operator risk assessment parameter associated with the user upon receiving the personal identification from the user; and
   means for determining whether the current risk estimation for the one or more machines is within a range of acceptable operator risk conditions, the acceptable operator risk conditions are determined by the at least one operator assessment parameter associated with the user.

* * * * *